US011334228B1

(12) United States Patent
Pashintsev et al.

(10) Patent No.: US 11,334,228 B1
(45) Date of Patent: May 17, 2022

(54) DYNAMIC TARGETING OF PREFERRED OBJECTS IN VIDEO STREAM OF SMARTPHONE CAMERA

(71) Applicant: Evernote Corporation, Redwood City, CA (US)

(72) Inventors: Alexander Pashintsev, Cupertino, CA (US); Boris Gorbatov, Sunnyvale, CA (US); Eugene Livshitz, San Mateo, CA (US); Vitaly Glazkov, Moscow (RU)

(73) Assignee: EVERNOTE CORPORATION, Redwood City, CA (US)

( * ) Notice: Subject to any disclaimer, the term of this patent is extended or adjusted under 35 U.S.C. 154(b) by 675 days.

(21) Appl. No.: 15/079,513

(22) Filed: Mar. 24, 2016

Related U.S. Application Data

(60) Provisional application No. 62/139,865, filed on Mar. 30, 2015.

(51) Int. Cl.
*G06F 3/04842* (2022.01)
*G06F 3/01* (2006.01)
(Continued)

(52) U.S. Cl.
CPC .......... *G06F 3/04842* (2013.01); *G06F 3/017* (2013.01); *G06F 3/04883* (2013.01); *H04N 1/19594* (2013.01); *H04M 1/0264* (2013.01)

(58) Field of Classification Search
CPC .. G06F 3/017; G06F 3/04842; G06F 3/04883; G06F 3/0488; G06F 3/005; G06F 17/30247; G06F 17/30256; G06F 17/30793; G06F 17/30253; G06K 9/46; G06K 9/6267; G06K 9/32; G06K 9/00268; G06K 9/4604; G06K 9/00456; G06K 9/00288; G06T 1/00; G06T 7/20; G06T 2207/10016; G06T 7/70; G06T 2207/30244; G06T 2207/10004; G06T 2207/30176; G06T 7/194; G06T 7/11; G06T 7/00;
(Continued)

(56) References Cited

U.S. PATENT DOCUMENTS 5,742,287 A * 4/1998 Lection ............... G06F 3/04842
345/649
6,868,527 B2 * 3/2005 Marler ................ G06F 3/04842
348/E5.103
(Continued)

*Primary Examiner* — Adam M Queler
*Assistant Examiner* — Maria S Ayad
(74) *Attorney, Agent, or Firm* — Morgan, Lewis & Bockius LLP

(57) ABSTRACT

Selecting objects in a video stream of a smart phone includes detecting quiescence of frame content in the video stream, detecting objects in a scene corresponding to the frame content, presenting at least one of the objects to a user of the smart phone, and selecting at least one of the objects in a group of objects in response to input by the user. Detecting quiescence of frame content in the video stream may include using motion sensors in the smart phone to determine an amount of movement of the smart phone. Detecting quiescence of frame content in the video stream may include detecting changes in view angles and distances of the smart phone with respect to the scene. Detecting objects in a scene may use heuristics, custom user preferences, and/or specifics of scene layout. At least one of the objects may be a person or a document.

26 Claims, 5 Drawing Sheets

(51) Int. Cl.
*G06F 3/04883* (2022.01)
*H04N 1/195* (2006.01)
*H04M 1/02* (2006.01)

(58) Field of Classification Search
CPC . G06T 2207/20021; G06T 7/10; G06T 7/579; H04N 5/23293; H04N 19/172; H04N 1/0044; H04N 19/19594; H04M 1/0264
See application file for complete search history.

(56) References Cited

U.S. PATENT DOCUMENTS

| | | | | |
|---|---|---|---|---|
| 8,600,167 | B2* | 12/2013 | Showering | H04N 5/225 382/190 |
| 8,913,285 | B1* | 12/2014 | Neubrand | H04N 1/3873 358/1.9 |
| 9,681,016 | B2* | 6/2017 | Arputharaj | H04N 1/04 |
| 10,216,730 | B2* | 2/2019 | Du | G06F 3/0488 |
| 2007/0094093 | A1* | 4/2007 | Hallbauer | G06Q 30/0247 705/26.1 |
| 2008/0307308 | A1* | 12/2008 | Sullivan | G06F 16/9577 715/723 |
| 2009/0307607 | A1* | 12/2009 | Schauls | G06F 3/0483 715/752 |
| 2010/0061634 | A1* | 3/2010 | Howie | G06F 16/313 382/176 |
| 2010/0292917 | A1* | 11/2010 | Emam | A61H 3/061 701/533 |
| 2011/0039534 | A1* | 2/2011 | Lee | H04M 1/7253 455/420 |
| 2011/0141254 | A1* | 6/2011 | Roebke | G06F 17/30041 348/61 |
| 2012/0294520 | A1* | 11/2012 | Mei | G06F 16/434 382/164 |
| 2013/0022330 | A1* | 1/2013 | Carter | H04N 21/475 386/224 |
| 2013/0054636 | A1* | 2/2013 | Tang | G06F 16/38 707/769 |
| 2013/0275411 | A1* | 10/2013 | Kim | G06F 17/30277 707/722 |
| 2014/0028546 | A1* | 1/2014 | Jeon | G06F 3/014 345/156 |
| 2014/0050409 | A1* | 2/2014 | Constantinou | G06K 9/2054 382/195 |
| 2014/0053086 | A1* | 2/2014 | Kim | H04L 65/4015 715/753 |
| 2014/0068514 | A1* | 3/2014 | Ito | H04N 5/23293 715/810 |
| 2014/0096084 | A1* | 4/2014 | Kwon | G06F 3/0482 715/835 |
| 2014/0111638 | A1* | 4/2014 | Isakov | H04N 5/23222 348/135 |
| 2014/0282201 | A1* | 9/2014 | Pasquero | G06F 3/0237 715/773 |
| 2014/0294236 | A1* | 10/2014 | Biller | G06K 9/18 382/103 |
| 2014/0297646 | A1* | 10/2014 | Bastiaens | G06F 16/35 707/740 |
| 2014/0300775 | A1* | 10/2014 | Fan | H04N 1/32128 348/231.3 |
| 2014/0327940 | A1* | 11/2014 | Amtrup | H04N 1/00251 358/473 |
| 2015/0062120 | A1* | 3/2015 | Reisner-Kollmann | G06T 17/00 345/419 |
| 2015/0074602 | A1* | 3/2015 | VanBlon | G06F 3/0488 715/815 |
| 2015/0095855 | A1* | 4/2015 | Bai | G06F 3/017 715/863 |
| 2015/0106754 | A1* | 4/2015 | Somasundaram | G06F 3/04842 715/765 |
| 2015/0220257 | A1* | 8/2015 | Moore | G06K 9/2081 715/765 |
| 2017/0090693 | A1* | 3/2017 | Ku | G06F 3/04817 |

* cited by examiner

DYNAMIC TARGETING OF PREFERRED OBJECTS IN VIDEO STREAM OF SMARTPHONE CAMERA

CROSS-REFERENCE TO RELATED APPLICATIONS

This application claims priority to U.S. Prov. App. No. 62/139,865, filed on Mar. 30, 2015, and entitled "DYNAMIC TARGETING OF PREFERRED OBJECTS IN SMARTPHONE VIDEO STREAM", which is incorporated herein by reference.

TECHNICAL FIELD

This application is directed to the field of capturing, analyzing and presenting information and user interfaces, and more particularly to the field of capturing analyzing and presenting information and user interfaces in connection with detecting, targeting and selecting preferred objects from a sequence of frames of a preview video stream of a smartphone camera.

BACKGROUND OF THE INVENTION

Mobile phones with digital cameras are dominating worldwide mobile device markets. 2014 was the first year when worldwide smartphone sales have surpassed one billion units. According to market statistics and forecasts, by 2018, annual smartphone shipments are expected to grow to 1.87 billion units; over 80% of all mobile phones will be arriving to customers with embedded digital cameras. Such pervasive use of smartphone cameras is expected to drive annual sales of embedded phone cameras by worldwide vendors to mobile phone manufacturers to 1.5 billion units.

Market research indicates that photographing with phone cameras has topped most popular activities of smartphone owners. It is employed by 82% of users, exceeding the next popular application, texting, which is utilized by 80% of owners. Recent studies indicate that over 25% of all photographs have been taken with smartphones; the total count of images posted on social photo-sharing sites and originally taken with smartphones has exceeded the cumulative count for posted photographs captured with every type of non-smartphone equipment.

Hundreds of millions smartphone users are utilizing smartphone cameras in their business offices and homes. Paper documents retain a significant role in the everyday information flow of business users and households. The role of digitizing and capturing of paper based information has increased with the arrival of unified multi-platform content management systems, such as the Evernote service and software developed by Evernote Corporation of Redwood City, Calif. Pages from books and magazines, printed newspaper articles, receipts, invoices, checks, tax and other forms, printed reports, business cards, handwritten notes and memos on legal pads, in specialized Moleskine notebooks, on sticky notes or easels, and many other types of printed and handwritten documents are benefiting from digital capturing. Additionally, capturing content from conventional whiteboards and new types of media such as IdeaPaint walls during meetings using smartphone cameras is also becoming popular. Thus, according to a recent survey, 72% of participants have taken a photograph of a smartboard at some point, while 29% had 10 or more images of whiteboard content saved on their phone or tablet. Growing quality and resolution of photographs and expanding feature sets of smartphone cameras allow users to capture scenes with rich content and multiple objects.

In recent years, many software applications for advanced real-time processing of photographs made with smartphone cameras have been developed. These applications may improve image quality, reduce blur, fix perspective distortions, lighting defects and glare, add special color, texture and other effects. Another class of software tools is increasingly capable of identifying different types of objects in photographed scenes, including faces, plants, artwork, food, one- and two-dimensional barcodes, text in different languages, etc. Combined with cloud services or working standalone, software applications may further recognize objects such as barcodes, text and faces and assign alphanumeric values or names to objects. Progress has also been made in automatic scanning of paper documents, whiteboards and other media using smartphone cameras. Thus, Scannable software by Evernote Corporation may identify and automatically capture document pages in complex scenes with perspective and other types of image correction; the Scannable software also retrieves content layout within document pages.

Notwithstanding a significant progress in pre-processing, correction and recognition of scenes captured with smartphone cameras, interaction between the smartphone and the user in the photographing process remains insufficient. Most of processing results arrive to the user post factum when the photo has already been captured; users have limited capabilities to select a sub-scene or a set of dedicated objects from a complex scene, avoid capturing unnecessary objects, etc.

Accordingly, it becomes increasingly important to develop efficient methods and systems for interaction with a user at the time of capturing photographs with smartphone cameras.

SUMMARY OF THE INVENTION

According to the system described herein, selecting objects in a video stream of a smart phone includes detecting quiescence of frame content in the video stream, detecting objects in a scene corresponding to the frame content, presenting at least one of the objects to a user of the smart phone, and selecting at least one of the objects in a group of objects in response to input by the user. Detecting quiescence of frame content in the video stream may include using motion sensors in the smart phone to determine an amount of movement of the smart phone. Detecting quiescence of frame content in the video stream may include detecting changes in view angles and distances of the smart phone with respect to the scene. Detecting objects in a scene may use heuristics, custom user preferences, and/or specifics of scene layout. At least one of the objects may be a person or a document. Presenting at least one of the objects may include drawing a frame around the at least one of the objects and/or changing color of the at least one of the objects. Presenting at least one of the objects may include sequentially displaying on a screen of the smartphone each of a set of scenarios for a final choice by the user, where each of the scenarios includes at least one of the objects. Detecting objects in a scene may include the user actively preselecting objects by changing position and view angle of the smart phone to cause desired objects to occupy a significant portion of a screen of the smart phone. The user may select the group of the objects by waiting a predetermined amount of time without rejecting the group while the group is presented to the user on the smart phone. The user may reject groups presented to the user on the smart phone by performing a rejection gesture. The rejection gesture may be shaking the smart phone left-and-right several times. The user may select the group of objects using eye-tracking, spatial gestures captured by a wearable device, and/or analysis of facial expressions. The user may select the group of objects using tapping a dedicated button on a screen of the smart phone, touching the screen, and/or performing a multi-touch approval gesture on the smart phone.

According further to the system described herein, a non-transitory computer-readable medium contains software that selects objects in a video stream of a smart phone. The software includes executable code that detects quiescence of frame content in the video stream, executable code that detects objects in a scene corresponding to the frame content, executable code that presents at least one of the objects to a user of the smart phone, and executable code that selects at least one of the objects in a group of objects in response to input by the user. Executable code that detects quiescence of frame content in the video stream may use motion sensors in the smart phone to determine an amount of movement of the smart phone. Executable code that detects quiescence of frame content in the video stream may detect changes in view angles and distances of the smart phone with respect to the scene. Executable code that detects objects in a scene may use heuristics, custom user preferences, and/or specifics of scene layout. At least one of the objects may be a person or a document. Executable code that presents at least one of the objects may include executable code that draws a frame around the at least one of the objects and/or changes color of the at least one of the objects. Executable code that presents at least one of the objects may sequentially display on a screen of the smartphone each of a set of scenarios for a final choice by the user, where each of the scenarios includes at least one of the objects. The user may actively pre-select objects by changing position and view angle of the smart phone to cause desired objects to occupy a significant portion of a screen of the smart phone. The user may select the group of the objects by waiting a predetermined amount of time without rejecting the group while the group is presented to the user on the smart phone. The user may reject groups presented to the user on the smart phone by performing a rejection gesture. The rejection gesture may be shaking the smart phone left-and-right several times. The user may select the group of objects using eye-tracking, spatial gestures captured by a wearable device, and/or analysis of facial expressions. The user may select the group of objects using tapping a dedicated button on a screen of the smart phone, touching the screen, and/or performing a multi-touch approval gesture on the smart phone.

The proposed system monitors smartphone camera motion, including coordinates, rotation angles and motion speed; processes video flow captured by the smartphone once the camera motion stabilizes; analyzes frames of video flow as scenes in order to detect preferred objects; builds, when necessary, multi-object scenarios for subsequent interactions with a user; presents a sequence of highlighted scenarios to the user and allows the user to choose desired sub-scenes and objects during an interaction with the system, which may include positional targeting, use of rejection/approval gestures, timeout-based acceptance of a suggested scenario and other types of interaction. Subsequently, the system may capture a high-resolution static shot of a chosen sub-scene, object or set of objects and store the captured information on user's behalf.

The process includes several phases, some of which may be optional:

1. Pre-Positioning

A user may start targeting a scene by moving a camera of a smartphone to a desired position. In many cases, the movement is fast enough, and even though the camera is registering an intermediate video stream, frame content may be changing too frequently to make any sense of any intermediate scenes. The state of pre-positioning may be detected by the system through monitoring motion sensors of the smartphone and calculating speed of changes of a position and orientation of the camera: fast movement and/or rotations may indicate that camera position and/or view angle are unstable; accordingly, the system may abandon analysis of video flow captured during the pre-positioning phase.

2. Scene Analysis

Once the user has stabilized the camera and the frame content has quiesced (i.e., frequent changes in the video flow have subsided), the system may analyze the scenes represented by periodically refreshed frames of the video flow. The frequency of processing may be defined, for example, by performance of the smartphone, so that, for example, the next processed frame may be chosen from the video flow in the camera preview mode as a frame that immediately follows an end time of analysis of a scene associated with a previous frame.

Methods and outcomes of analysis of a scene may depend on a type of the scene, which may be assessed by the system using camera distance to objects in the scene, lighting conditions and other parameters of the video flow. Thus, in a live scene where the video flow captures a relatively distant 3D environment, the system may use object recognition technologies, including deep learning, face recognition, etc. to identify and tag different types of objects, such as an individual or a group of people, a building, a plant, a sign, as well as various combinations thereof. In contrast, a close photo scan of a document, a set of documents, a newspaper or a magazine page arranged on a desk may focus on detecting document pages, recognizing document layouts, separating text blocks from drawings and charts, etc. Under any circumstances, an outcome of scene analysis may be seen as a plain or hierarchical collection of objects.

3. Identifying Preferred Objects

For a complex scene with dozens or even hundreds of objects, identifying a relatively small number of preferred objects may present an important task of the system. Heuristics, custom user preferences, specifics of scene layout and other considerations may be taken into account for such identification.

For example, in a real-life scene, an individual or a small group of individuals, a building or another object near the center of the scene may become a candidate for a preferred object even when unobstructed or only slightly obstructed by other objects. Additionally, if a candidate is a person, then, by association, other individuals captured with a sufficient quality (focus, distance) in the same scene may be considered as a next set of candidates for preferred objects.

In case of document capturing, a handwritten note positioned close to the center of a scene and shielding from view a portion of another document may be considered a preferred object. If a similar scene contains several handwritten notes (e.g. sticky pads with comments on top of a document), each note that is fully represented (not substantially cut-off) in a frame may be considered a preferred object.

4. Building Multi-Object Scenarios

In some cases, scene analysis may reveal a single preferred object that may be immediately presented to a user. More frequently, however, the system may identify multiple preferred objects; accordingly, choices of a user with respect to final capturing of an object or a group of objects on the still shot may be uncertain. One example is a newspaper or a magazine page where multiple objects appear in a scene (articles with headings, printed in multiple columns, separately standing images, images surrounded by a text flow, etc.). The page may also be partially cut off by a current frame, which may serve as an indication of interests of the user. Objects with cut-off portions may be de-prioritized; but there may still be too many objects (i.e. components of the page layout in the scene) to make an automatic decision.

To facilitate user choices, the system may build several multi-object scenarios by grouping objects in the scene for sequential presentation of the groups for choice of the user. For example, in a newspaper/magazine page scenario, an original scene may include a portion of the page with an article printed in three columns under a header spanning all columns, and the rest of the page content may be cut off. For such a scene, the system may build a list of scenarios where the article as a whole, each of its columns without a header or each pair of adjacent columns under a header, may be used to form distinct scenarios presented to the user. Another example for a real-life 3D scene may present a building, an individual standing next to the building, a tree near the building, any pairwise combination of the above, and all three objects together as distinct scenarios.

5. Presenting and Interactively Selecting a Desired Scenario

This phase signifies an important component of the system. The system may present multi-object scenarios to the user one-by-one with highlighted objects that form a corresponding group associated with the scenario being presented (for example, the first column of a three-column article). The user may have several mechanisms for reacting to the displayed scenario to indicate a final choice:

Approval—the user may silently approve the scenario by waiting for a relatively short timeout to expire, after which the system would consider the current scenario chosen and may subsequently (i) take a hi-resolution static shot of the scene; (ii) clip the group of objects forming the scenario (previously highlighted to the user) from the scene; and (iii) display the group of objects to the user for sharing, saving and other post-choice actions. As an alternative to timeout-based scenario selection, an approval may be granted by the user by tapping a dedicated button on the screen (overlaid upon the scene), touching the screen, performing a multi-touch approval gesture, etc.

Rejection—the user may reject a currently displayed scenario by performing, for example, a rejection gesture adopted in some mobile operating systems, such as shaking a camera left-and-right several times. This may cause an instant abandonment of the current scenario and the system then displays a next scenario. If the scenarios are exhausted and the choice still has not been made, the system may display a corresponding message and may offer a user to repeat scanning of the scenarios.

Re-targeting—the user may move the camera to zoom in to a portion of the scene in order to indicate a desired choice. For example, in the above example of a three-column article on a newspaper page, the user may shift the camera and/or move the camera closer to the page to capture a sub-scene of the original scene, so that the desired column or desired couple of columns appear near the center of the scene. Then the system may rebuild and display just the scenarios associated with the sub-scene for user approval.

Other mechanisms of interaction with the camera in connection with the object selection process, such as eye-tracking, spatial gestures captured by a wearable device, for example, a smart wristband, detection and parallel analysis of facial expressions of the user by an additional user-facing camera may also be used.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for identifying preferred objects in frames of preview video stream of a smartphone camera, building possible scenarios of object selection, providing a user with choice options and tools and creating photographs of chosen objects or their combinations for subsequent use.

Figure 1:
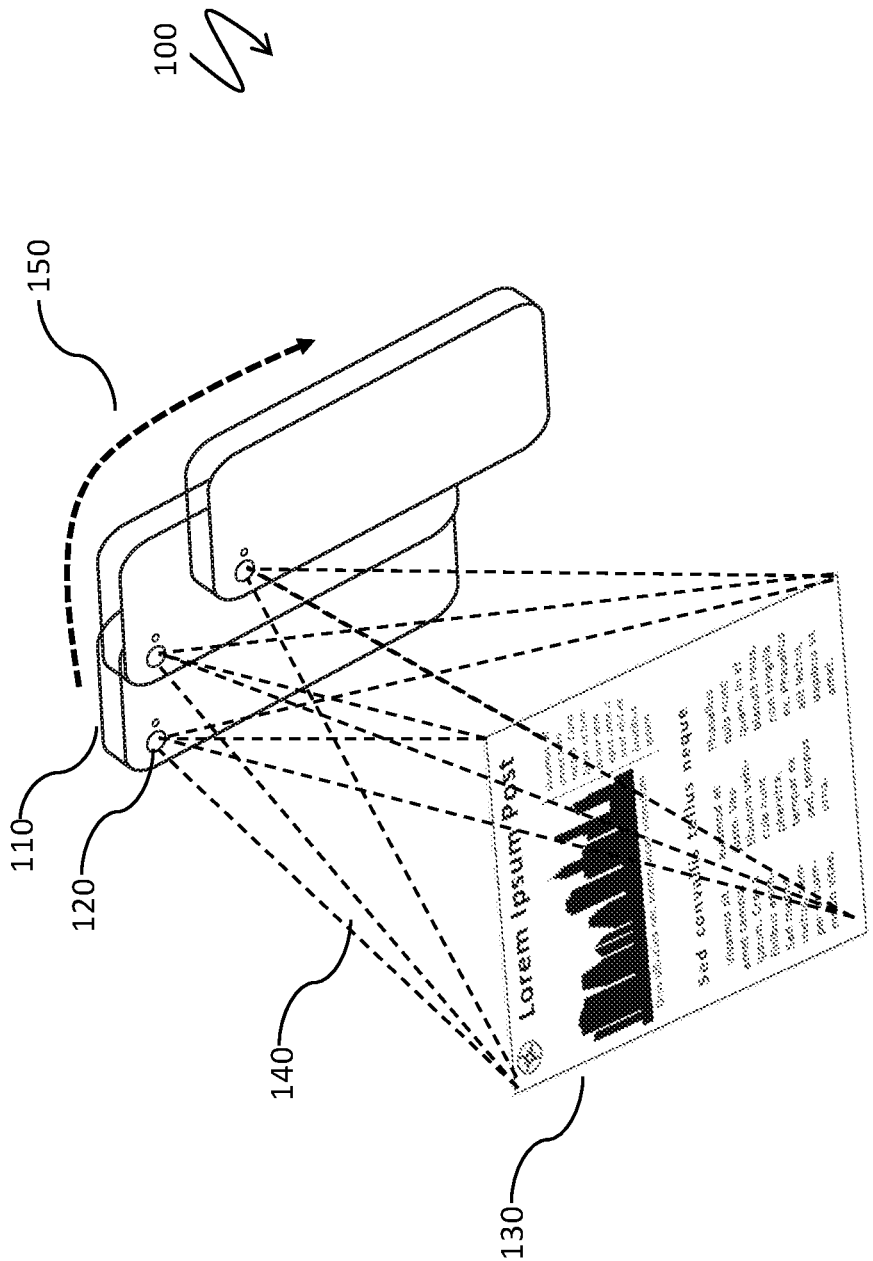
FIG. 1 is a schematic illustration of fast camera movement during pre-positioning when scene analysis is not performed, according to an embodiment of the system described herein.

FIG. 1 is a schematic illustration 100 of fast camera movement during pre-positioning when scene analysis is not performed. A smartphone 110 with an embedded camera 120 is aimed by a user of the camera 120 at a document page 130 arranged on a surface. At this preliminary stage of taking a photograph of the document, both view angles and distances 140 of the camera 120 are changing rapidly, as shown by a camera trajectory 150. The system assesses a speed of changing camera position and view angle, as explained elsewhere herein, and remains in a motion monitoring mode, without analyzing scenes in a video stream.

Figure 2:
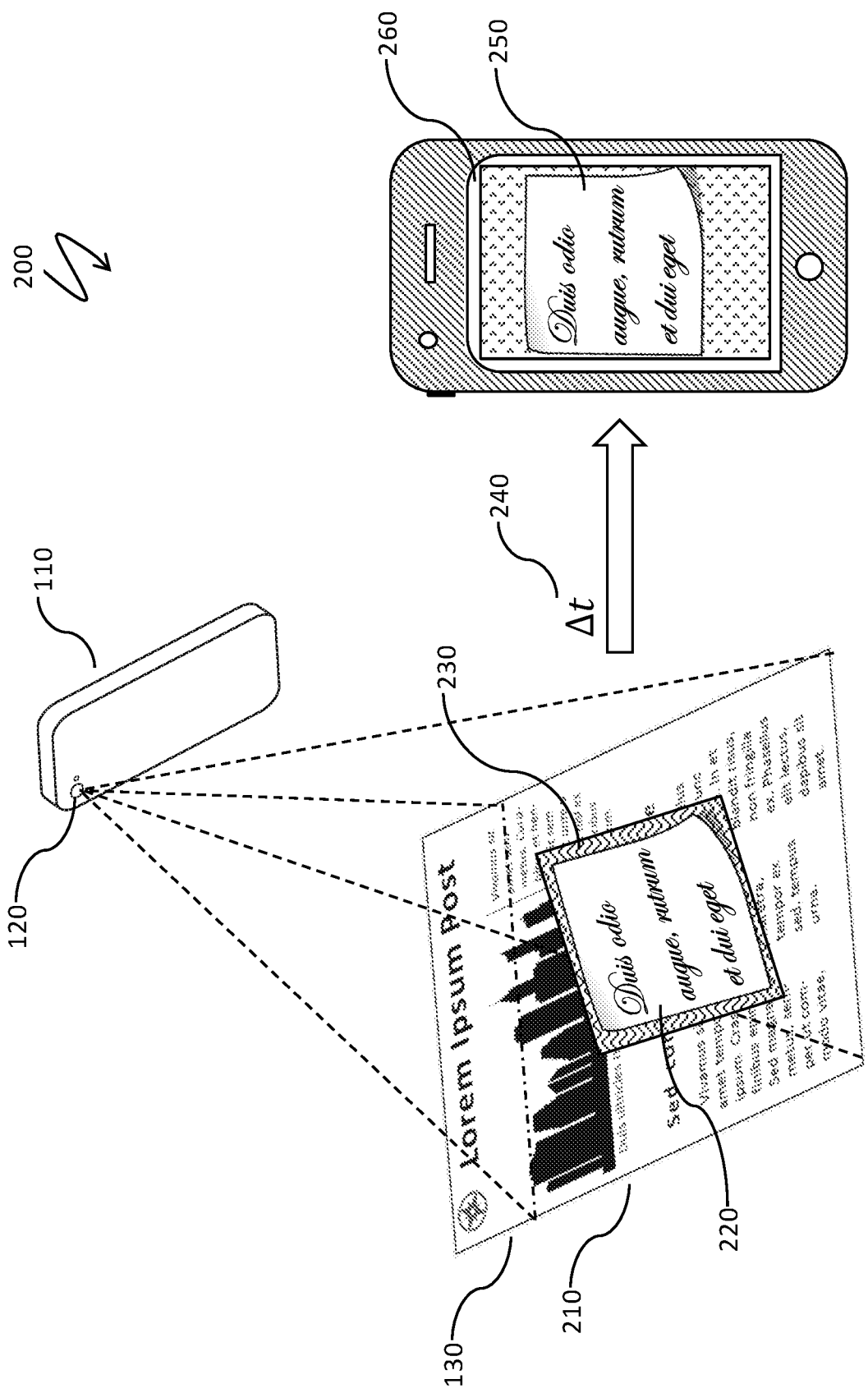
FIG. 2 schematically illustrates retrieval and timeout-based confirmation of a preferred object in a scene, according to an embodiment of the system described herein.

FIG. 2 is a schematic illustration of a retrieval and timeout-based confirmation of a preferred object in a scene. The smartphone 110 with the embedded camera 120 has stabilized after a preliminary targeting phase, explained in connection with FIG. 1. A current frame 210 of a preview video stream contains a portion of the document page 130. Additionally, a handwritten note 220 is placed on top of the page 130. The system identifies the note 220 as a preferred object using techniques explained elsewhere herein. The system highlights the preferred object with a frame 230 (other highlighting techniques based on color, contrast and other image attributes may also be used). If the user agrees with the selection of the preferred object, no action is required; in this embodiment, the system automatically accepts inactivity of the user for a predetermined amount of time 240 as a confirmation. Then, the system causes the camera 120 to make a static photograph of the frame 230, retrieve only a preferred object, perform perspective, color, geometric (e.g. rotation) and other corrections, and display a cleaned up preferred object 250 on a screen 260 of the smartphone 110. Note that, in other embodiments, the system may provide a confirmation button, a multi-touch or a spatial gesture or other tools for a proactive confirmation of acceptance of a preferred object by the user.

Figure 3:
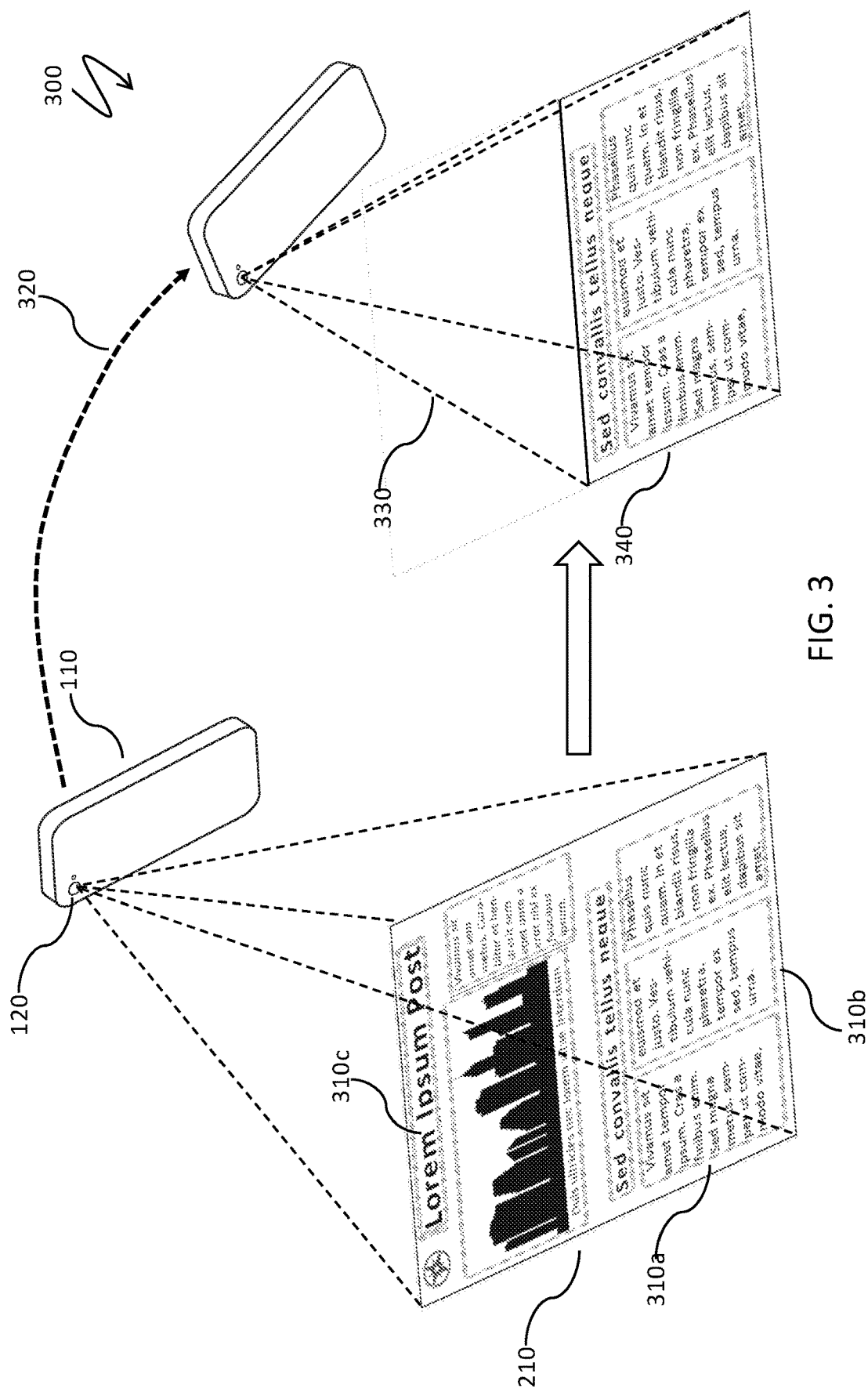
FIG. 3 is a schematic illustration of altering a scene via positional targeting of a camera by a user, according to an embodiment of the system described herein.

FIG. 3 is a schematic illustration 300 of altering a scene via positional targeting of the camera 120 by a user as a mechanism of preliminary object selection. In the example of FIG. 3, the current frame 210 of a video stream for the smartphone 110 with the camera 120 contains a whole document page, similar to the page 130 in FIG. 1, discussed above. The frame 210 has been analyzed by the system once the camera 120 arrives to a stable position and several objects have been identified as candidates for a preferred object set and highlighted in the frame 210 for subsequent user selection; examples include text columns 310*a*, 310*b*, a page title 310*c* and all other objects highlighted by similar frames.

In contrast with FIG. 2, where the user agrees with the system identification of a (single) preferred object and confirms a system choice by waiting for the timeout to occur, in FIG. 3 the user actively pre-selects a subset of objects for further consideration by changing camera position and view angle, as schematically shown by a camera trajectory 320 and an altered view angle 330. A change of camera view results in a new frame 340 of the video stream, which includes a three-column article with a title located in a bottom portion of the previous frame 210 of the video stream. Note that, while in the example of FIG. 3 the user has chosen a multi-object scene via positional targeting, a final user choice may be a single object.

Figure 4:
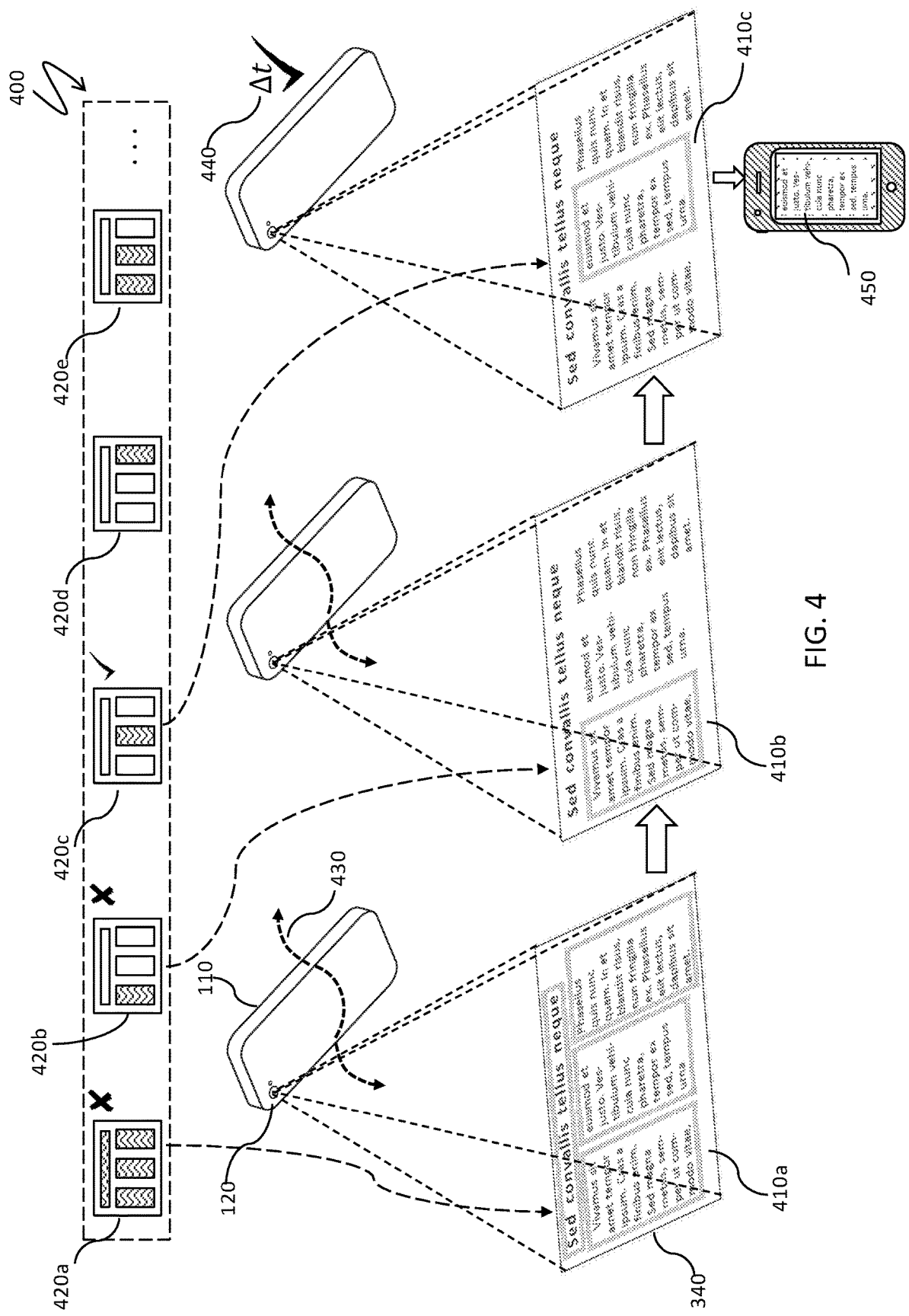
FIG. 4 is a schematic illustration of generation and selecting of a desired set of preferred objects, according to an embodiment of the system described herein.

FIG. 4 is a schematic illustration 400 of illustration of generation and selection of a desired set of preferred objects. Based on a selection of subset of preferred objects (e.g., the example of FIG. 3), the system may generate a set of scenarios for a final choice by the user and sequentially display the set of scenarios on the screen of the smartphone 110.

An original position of the smartphone 110 with the camera 120 indicates the frame 340 pre-selected by the user according to FIG. 3. Unlike FIG. 2, the frame 340 contains multiple candidate objects and the user may want to select a subset as a final choice by the user. The system may first generate a scenario 410*a* where all four objects in a scene are included in a final choice and display a corresponding scenario on the screen of the smartphone 110 as a pictogram 420*a*. In the example of FIG. 4, the user disagrees with a first scenario and indicates disagreement by using a conventional spatial rejection gesture 430 (shaking the camera back and forth, imitating shaking one's head), implemented in certain models of smartphones. Other spatial, multi-touch gestures, on-screen buttons or other tools may serve the same rejection purpose. Upon receiving rejection by the user of the first scenario, also shown by a cross next to the pictogram 420*a*, the system may generate a second scenario 410*b* where only a first column of the article without the title is selected and display it as the pictogram 420*b*. The user may reject the second scenario 420*b*, too, so the system moves to a third scenario 410*c* and a corresponding pictogram 420*c* where only a second column of the article is selected as a preferred object. In FIG. 4, the user accepts the second scenario 410*c* and holds the smartphone 110 stable until a timeout 440 expires indicating approval. Subsequently, the system may take a static photo of the scene, retrieve only a chosen object 450 and display the chosen object 450 to the user, possibly after an additional processing to sharpen, clean up or resize an image corresponding to the object 450 (or other operations as necessary). Pictograms for additional scenarios 420*d*, 420*e* are shown for illustration purposes. Other confirmation methods are also possible, as explained elsewhere herein. In an embodiment, the system may group the scenarios 410*a*-410*e* and display several pictograms 420*a*-420*e* on the screen of the smartphone 110, offering to select a desired one of the scenarios 410*a*-410*e* by tapping on a pictogram.

Figure 5:
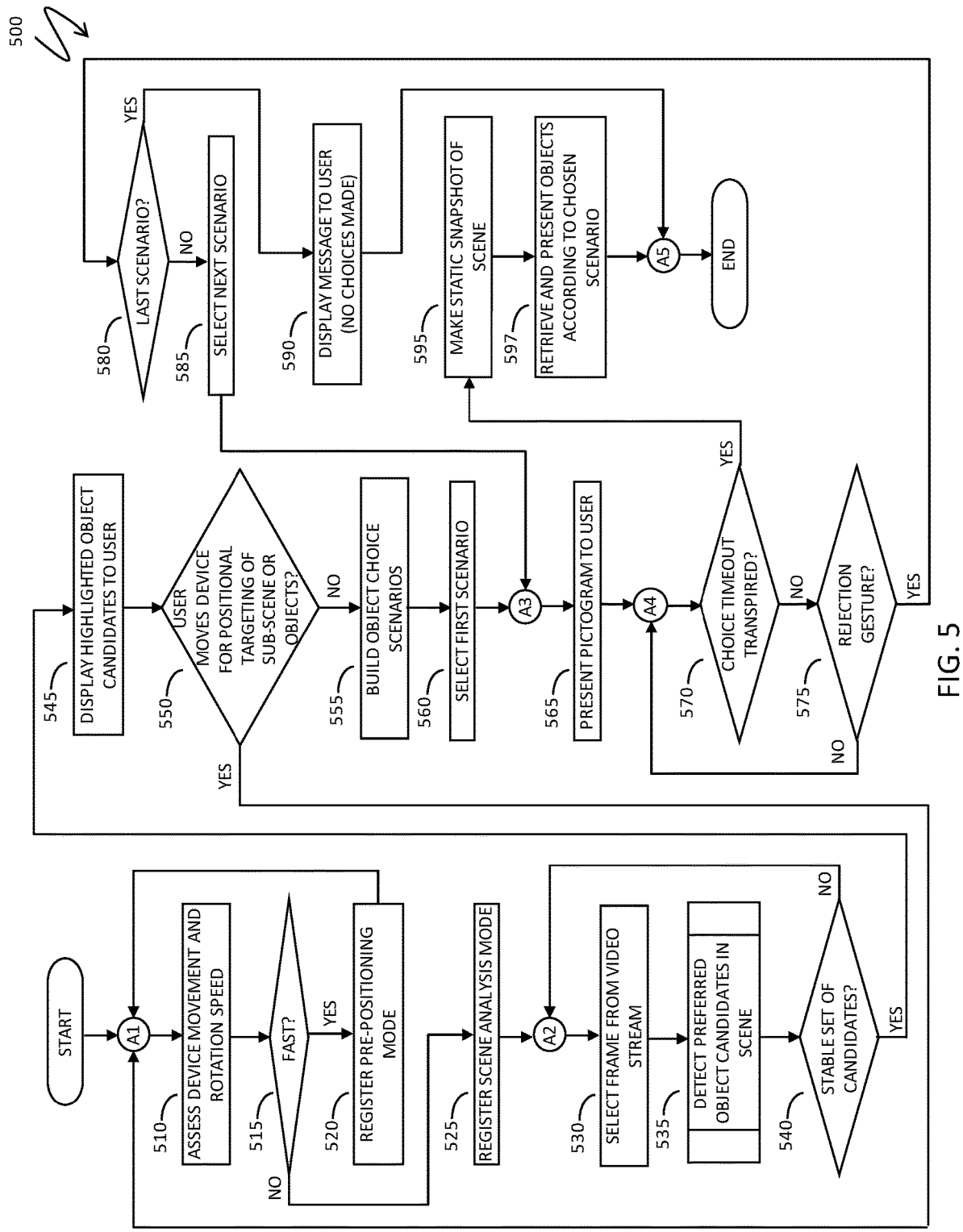
FIG. 5 is a system flow diagram illustrating system functioning, according to an embodiment of the system described herein.

Referring to FIG. 5, a system flow diagram 500 illustrates processing in connection with the system functioning. Processing begins at a step 510 where the system assesses device (smartphone) movement and rotation speed using built-in sensors. The system may also estimate a change of page view angle by processing a video stream from the smartphone. After the step 510, processing proceeds to a test step 515, where it is determined whether the change in position and view angle (if applicable) of the device are occurring rapidly. If so, processing proceeds to a step 520, where the system registers a pre-positioning mode. After the step 520, processing proceeds back to the step 510, where the system continues monitoring the device mode.

If it is determined at the test step 515 that the change in position and view angle (if applicable) of the device are not occurring rapidly, processing proceeds from the step 515 to a step 525, where the system registers a scene analysis mode. After the step 525, processing proceeds to a step 530, where the system selects a frame from the video stream for processing. After the step 530, processing proceeds to a step 535, where the system detects preferred object candidates in the scene. After the step 535, processing proceeds to a test step 540, where it is determined whether a set of candidates for preferred objects is stable over a period of time (time-based sequencing for scene analysis, described elsewhere herein, is not shown in FIG. 5). If the set of candidates for preferred objects is not stable over a period of time, processing proceeds back to the step 530, discussed above. Otherwise, processing proceeds to a step 545 where candidate objects are highlighted and displayed to the user. After the step 545, processing proceeds to a test step 550, where it is determined whether the user is moving the device for positional targeting of a sub-scene or individual objects with the embedded camera, as explained elsewhere herein, including FIG. 3 and the accompanying text. If so, processing proceeds back to the step 510 to monitor device movement; otherwise, processing proceeds to a step 555 where the system builds object choice scenarios, as explained, for example, in FIG. 4 and the accompanying text.

After the step 555, processing proceeds to a step 560, where a first scenario is selected and a corresponding pictogram for displaying to the user is built, as illustrated, for example, by items 420*a*-420*e* in FIG. 4. After the step 560, processing proceeds to a step 565, where the pictogram is presented to the user. After the step 565, processing proceeds to a test step 570, where it is determined whether a choice timeout (predetermined amount of time for determining a user choice) has transpired, as explained in more details in conjunction with the predetermined amount of time 240 in FIG. 2 and the timeout 440 in FIG. 4. If not, processing proceeds to a test step 575, where it is determined whether the user has made a rejection gesture (or otherwise rejected the current scenario, as explained elsewhere herein).

If not, processing proceeds back to the test step 570 to monitor user behavior within the choice timeout period (ending when the choice timeout transpires); otherwise, processing proceeds (without any user choice made) to a test step 580, where it is determined whether a currently selected scenario is a last scenario generated by the system. If not, processing proceeds to a step 585 where the next scenario is generated. After the step 585, processing proceeds back to the step 565 to offer the newly selected scenario for user choice. If it is determined at the step 580 that the current scenario is the last scenario, processing proceeds to a step 590 where the system displays to the user a message that no object choice has been made; after the step 590, processing is complete. If it is determined at the test step 570 that the choice timeout has transpired, then control transfers from the test step 570 to a step 595, where a static snapshot of the scene is made. After the step 595, processing proceeds to a step 597, where the system retrieves objects chosen by the user from the photograph and presents the objects to the user. After the step 597, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The smartphone may include software that is pre-loaded with the device, installed from an app store, installed from a desktop (after possibly being pre-loaded thereon), installed from media such as a CD, DVD, etc., and/or downloaded from a Web site. The smartphone 110 may use an operating system selected from the group consisting of: iOS, Android OS, Windows Phone OS, Blackberry OS and mobile versions of Linux OS. The smartphone 110 may be connected by various types of wireless and other connections, such as cellular connections in Wide Area Networks, Wi-Fi, Bluetooth, NFC, USB, infrared, ultrasound and other types of connections. A mobile device other than a smartphone may be used. Note that the system described herein may be used with other devices capable of taking a photograph and providing appropriate feedback to a user, such as a wireless digital camera with a screen for providing messages to the user and a mechanism for providing an intermediate image stream.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of selecting objects in a video stream captured by a user device, the method comprising:
    detecting quiescence of frame content in the video stream;
    in response to detecting a quiescent state of the frame content in the video stream, detecting a plurality of objects corresponding to the frame content;
    determining, without user interaction, a plurality of scenarios, wherein:
        a first respective scenario of the plurality of scenarios includes all of the plurality of objects; and
        a second respective scenario of the plurality of scenarios includes a subset of the plurality of objects less than all of the plurality of objects and is distinct from the first respective scenario including all of the plurality of objects corresponding to the frame content;
    after determining the plurality of scenarios, presenting for user selection, by the user device, the first respective scenario by displaying the frame content with an overlay highlighting within the frame content all of the plurality of objects detected in the frame content;
    in response to detecting a first user input that rejects the first respective scenario, presenting for user selection, by the user device, the second respective scenario by displaying the frame content with an overlay highlighting within the frame content the one or more objects of the subset of the plurality of objects without highlighting the other objects of the plurality of objects detected in the frame content;
    in response to detecting a second user input that selects the second respective scenario, capturing the frame content in the video stream;
    retrieving, from the frame content, the one or more objects of the subset of the plurality of objects that correspond to the second respective scenario; and
    presenting, by the user device, the one or more objects of the subset of the plurality of objects.

2. The method of claim 1, wherein detecting quiescence of frame content in the video stream includes using motion sensors in the user device to determine an amount of movement of the user device.

3. The method of claim 1, wherein detecting quiescence of frame content in the video stream includes detecting a change in at least one of a view angle and a distance of the user device with respect to a scene that includes the plurality of objects.

4. The method of claim 1, wherein detecting the plurality of objects corresponding to the frame content uses at least one of:
    heuristics, custom user preferences, and specifics of scene layout.

5. The method of claim 1, wherein at least one of the plurality of objects is a person.

6. The method of claim 1, wherein at least one of the plurality of objects is a document.

7. The method of claim 1, wherein presenting a respective scenario includes drawing a frame around a respective set of objects.

8. The method of claim 1, wherein detecting the plurality of objects includes detecting a third user input that pre-selects at least a subset of the plurality of objects by changing the position and view angle of the user device to cause desired objects to occupy a significant portion of a screen of the user device.

9. The method of claim 1, wherein detecting user selection of a respective scenario from the plurality of scenarios includes determining that a predetermined amount of time has passed, while the respective scenario is presented to the user on the user device, without detection of a rejection input rejecting the respective scenario.

10. The method of claim 9, wherein detecting the rejection input includes detecting, while the respective scenario is presented to the user on the user device, a rejection gesture.

11. The method of claim 10, wherein the rejection gesture is shaking the user device left-and-right several times.

12. The method of claim 1, wherein detecting user selection of a respective scenario from the plurality of scenarios includes using at least one of: eye-tracking, spatial gestures captured by a wearable device, and analysis of facial expressions.

13. The method of claim 1, wherein detecting user selection of a respective scenario from the plurality of scenarios includes detecting at least one of: tapping a dedicated button on a screen of the user device, touching the screen, and performing a multi-touch approval gesture on the user device.

14. A non-transitory computer-readable medium containing software that selects objects in a video stream captured by a user device, the software comprising:
  executable code that detects quiescence of frame content in the video stream;
  executable code that in response to detecting a quiescent state of the frame content in the video stream, detects a plurality of objects corresponding to the frame content;
  executable code that determines, without user interaction, a plurality of scenarios, wherein:
    a first respective scenario of the plurality of scenarios includes all of the plurality of objects; and
    a second respective scenario of the plurality of scenarios includes a subset of the plurality of objects less than all of the plurality of objects and is distinct from the first respective scenario including all of the plurality of objects corresponding to the frame content;
  executable code that, after determining the plurality of scenarios, presents for user selection, by the user device, the first respective scenario by displaying the frame content with an overlay highlighting within the frame content all of the plurality of objects detected in the frame content;
  executable code that in response to detecting a first user input that rejects the first respective scenario, presents for user selection, by the user device, the second respective scenario by displaying the frame content with an overlay highlighting within the frame content the one or more objects of the subset of the plurality of objects without highlighting the other objects of the plurality of objects detected in the frame content;
  executable code that in response to detecting a second user input that selects the second respective scenario, captures the frame content in the video stream;
  executable code that retrieves, from the frame content, the one or more objects of the subset of the plurality of objects that correspond to the second respective scenario; and
  executable code that presents, by the user device, the one or more objects of the subset of the plurality of objects.

15. The non-transitory computer-readable medium of claim 14, wherein executable code that detects quiescence of frame content in the video stream uses motion sensors in the user device to determine an amount of movement of the user device.

16. The non-transitory computer-readable medium of claim 14, wherein executable code that detects quiescence of frame content in the video stream detects a change in at least one of a view and a distance of the user device with respect to a scene that includes the plurality of objects.

17. The non-transitory computer-readable medium of claim 14, wherein executable code that detects the plurality of objects corresponding to the frame content uses at least one of: heuristics, custom user preferences, and specifics of scene layout.

18. The non-transitory computer-readable medium of claim 14, wherein at least one of the plurality of objects is a person.

19. The non-transitory computer-readable medium of claim 14, wherein at least one of the plurality of objects is a document.

20. The non-transitory computer-readable medium of claim 14, wherein executable code that presents a respective scenario includes executable code that performs drawing a frame around a respective set of objects.

21. The non-transitory computer-readable medium of claim 14, wherein detecting the plurality of objects includes detecting a third user input that pre-selects at least a subset of the plurality of objects by changing the position and view angle of the user device to cause desired objects to occupy a significant portion of a screen of the user device.

22. The non-transitory computer-readable medium of claim 14, wherein detecting user selection of a respective scenario from the plurality of scenarios includes determining that a predetermined amount of time has passed, while the respective scenario is presented to the user on the user device, without detection of a rejection input rejecting the respective scenario.

23. The non-transitory computer-readable medium of claim 22, wherein detecting the rejection input includes detecting, while the respective scenario is presented to the user on the user device, a rejection gesture.

24. The non-transitory computer-readable medium of claim 23, wherein the rejection gesture is shaking the user device left-and-right several times.

25. The non-transitory computer-readable medium of claim 14, wherein detecting user selection of a respective scenario from the plurality of scenarios includes using at least one of: eye-tracking, spatial gestures captured by a wearable device, and analysis of facial expressions.

26. The non-transitory computer-readable medium of claim 14, wherein detecting user selection of a respective scenario from the plurality of scenarios includes detecting at least one of: tapping a dedicated button on a screen of the user device, touching the screen, and performing a multi-touch approval gesture on the user device.

\* \* \* \* \*